(12) United States Patent
Rye et al.

(10) Patent No.: US 6,229,433 B1
(45) Date of Patent: May 8, 2001

(54) APPLIANCE CONTROL

(75) Inventors: David John Rye, New York, NY (US); James Phillips, Bellevue, WA (US); Lesley Alan Leech, Kowloon (HK); David Richard Thompson, Fife (GB)

(73) Assignee: X-10 Ltd., Kowloon (HK)

( * ) Notice: Subject to any disclaimer, the term of this patent is extended or adjusted under 35 U.S.C. 154(b) by 0 days.

(21) Appl. No.: 09/364,714

(22) Filed: Jul. 30, 1999

(51) Int. Cl.[7] .................................................. H04M 11/04

(52) U.S. Cl. ............................... 340/310.01; 340/310.02; 340/538; 340/539; 340/825.06; 340/825.69

(58) Field of Search ........................ 340/310.01, 310.02, 340/825.06, 565, 825.69, 825.22, 538, 539, 541, 309.15, 310.03, 310.04; 701/2; 702/57; 180/167

(56) References Cited

U.S. PATENT DOCUMENTS

| | | | | |
|---|---|---|---|---|
| 4,755,792 | * | 7/1988 | Pezzolo et al. ....................... | 340/538 |
| 4,847,781 | * | 7/1989 | Brown, III et al. ................... | 364/492 |
| 5,565,855 | * | 10/1996 | Knibbe ............................. | 340/825.06 |
| 5,814,902 | * | 9/1998 | Creasy et al. ....................... | 307/116 |
| 5,938,757 | * | 8/1999 | Bertsch ................................. | 712/36 |

* cited by examiner

Primary Examiner—Edward Lefkowitz
Assistant Examiner—Davetta W. Goins
(74) Attorney, Agent, or Firm—Marvin N. Gordon

(57) ABSTRACT

An automated appliance control system includes a unit which transmits binary coded address and function control signals along the a.c. power line to a plurality of appliance control modules connected to the power line at various locations in the home. The binary coded signals transmitted along the a.c. power line are in the form of binary rf bursts which occur before and after the a.c. power line zero crossing points.

8 Claims, 9 Drawing Sheets

FIG. 7

APPLIANCE CONTROL

BACKGROUND OF THE INVENTION

The present invention relates generally to control systems, and more particularly to an improved system for automatically controlling the operation of home appliances and other electrically operated devices, such as lamps and television receivers.

As the number and usage of electrically operated devices, such as kitchen appliances, lamps and home entertainment products, has increased so has the desire of the homeowner and apartment resident to be able to establish and control the operation of these devices remotely and in an automated manner. For purposes of increased security and convenience, a homeowner may wish to cause a number of lamps and appliances throughout the house to be automatically turned on and off at preset times which may vary for different days of the week. Thus, for example, a homeowner may wish the coffee maker to be automatically turned on before he arises and the hall lights to be turned on before he arrives from work and turned off after he retires.

One prior approach to automated appliance control is disclosed in U.S. Pat. No. 4,200,862, assigned to the assignee of the present application, the disclosure of which is herein incorporated by reference. The control system disclosed in that patent includes a transmitter unit in which the module addresses and operating information concerning the appliances to be controlled automatically can be entered. The transmitter unit is connected to an a.c. power line, which transmits address and control signals in the form of binary coded bursts or pulses over the a.c. power line to a plurality of control modules also connected to the a.c. power line that control the operation of the electrical appliances, lamps, television sets, and the like that are respectively connected to the modules. The binary coded signals that are transmitted along the ac power line to the modules identify each of the modules by their address and control the operation of the electrical devices, that is, for example, turn them on or off, or dim them in the case of lights, at prescribed times.

In the apparatus control system disclosed in the '862 patent, the bursts or pulses that constitute the binary address and control signals are synchronized to the zero crossing points of the a.c. power line; that is, they are produced near or at the zero crossing points of the a.c. power. These pulses are received and detected at the modules and are then decoded to derive the address and control signals.

Although this system has proven to be highly successful over the years, certain drawbacks in it have became apparent. By limiting the detection of the absence or presence of a logic "one" signal only to the a.c. power line signal zero crossing points, the number of operating module binary address and control codes that can be generated during a given period of time is limited. It has also been found that the presence of noise on the ac power line could be mistaken by the module control units as a binary bit or logic "one" signal that could result in an erroneous operation of the module.

SUMMARY OF THE INVENTION

It is an object of the present invention to provide an automated appliance control system in which the number of available operating binary control codes is increased.

It is another object of the present invention to provide an automated control system which can control the operation of a greater number of electrical appliances and other electrical devices.

It is a further object of the invention to provide an automated appliance control system in which improved immunity to noise on the a.c. power line is achieved.

To these ends, the automated appliance control system of the invention transmits address and control or function codes along the existing ac power line from a programmed transmitter unit to a plurality of spaced control modules in the form of bursts of binary code produced both before and after each zero crossing point of the ac power line signal. The lamp and appliance control modules are connected to the ac power line, and each module of the modules controls a separate lamp, appliance, wall switch or the like to turn them on or off at preselected times of day in accordance with the received control signal. Each control module, which is identified by a unique binary address, receives and decodes the binary coded burst signals transmitted on the ac power line. When a module detects its address, it performs the prescribed control function such as on-off, dim or the like in accordance with the binary control signal also contained in the binary data bursts it has received from the transmitter unit.

The transmitter unit may have the additional capability of transmitting binary-coded (infrared) IR signals to control the operation of home audio/visual equipment in the same room, or through the use of an RF-to-IR converter to control audio/visual equipment located in other rooms in the home.

In another aspect of the invention, some of the binary coded address and control signals may be transmitted to one or more modules over the air by transmitting a coded rf signal to a special module which receives the signal, detects the transmitted binary code, and applies it to the ac power line on which it is transmitted to an appliance or lamp control module. In yet another aspect of the invention, the transmitter unit may be connected to a specially programmed PC, at which the homeowner, such as by the use of a mouse may establish the desired automatic appliance and lamp control that is implemented by the transmitter unit. In a further aspect of the invention, a macro, namely a group of events, such as the turning on of different lamps at prescribed times, may be scheduled to occur in response to the occurrence of another event.

To the accomplishment of the above, and to such further objects as may hereinafter appear, the present invention relates to an automated appliance control system substantially as defined in the appended claims and as described in the accompanying specification as considered with accompanying drawings, in which

BRIEF DESCRIPTION OF THE DRAWINGS

FIG. 7 is another PC screen display for use in programming controlled operation.

DETAILED DESCRIPTION OF THE INVENTION

Figure 1:
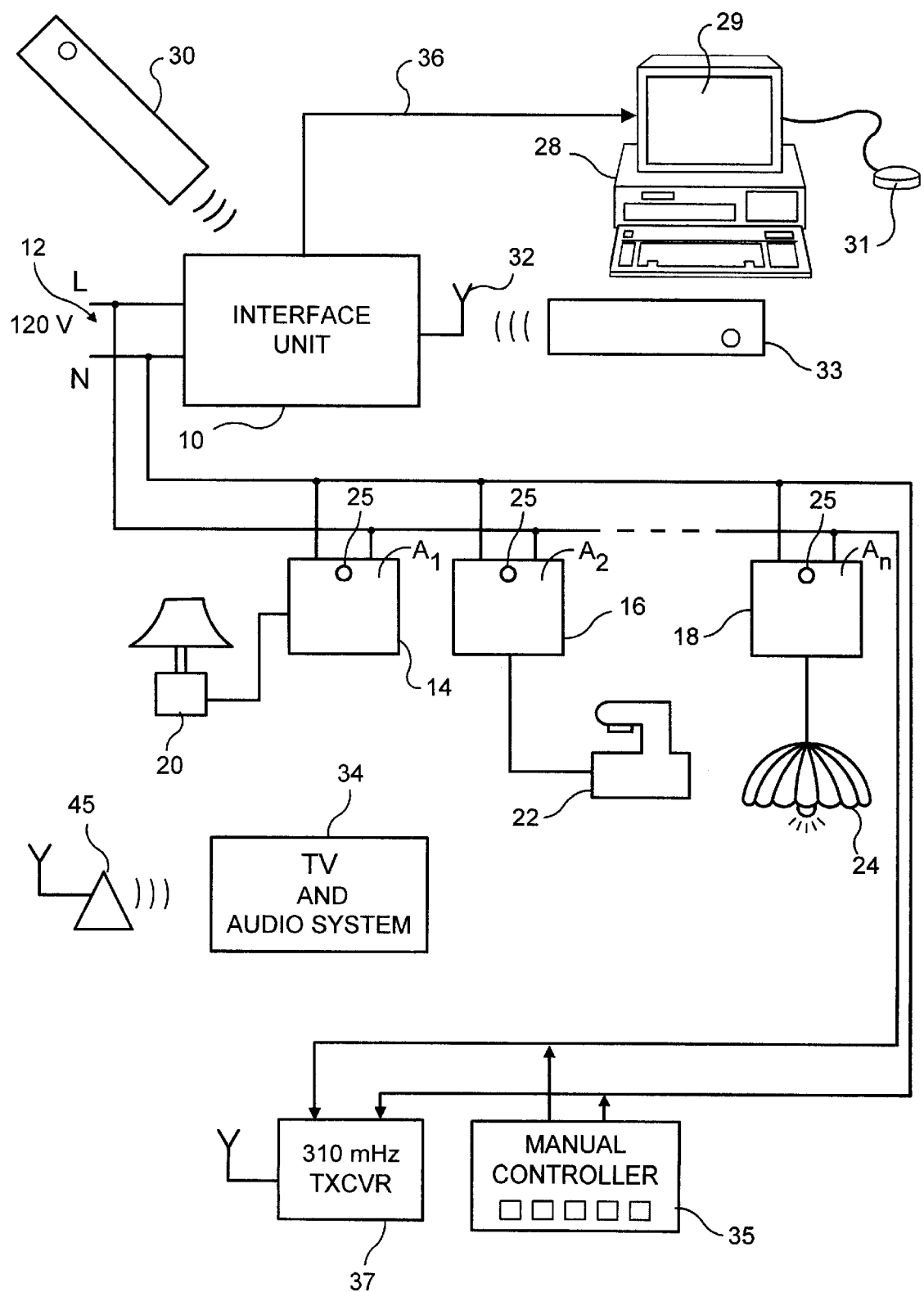
FIG. 1 is a schematic diagram of an exemplary application of the automated appliance control system of the invention.

The use of the automated home control system of the present invention in a typical home is illustrated in FIG. 1. As therein shown, a transmitter or home control interface unit 10 is plugged into a conventional 120 v 60 Hz a.c. power line 12. As described in greater detail below, interface unit 10 applies bursts or pulses of binary coded module address and control signals onto the power line 12. The binary coded signals are transmitted along the ac power line 12 to a plurality of control modules A1 to A(n) such as a lamp module 14, an appliance module 16 and a wall dimmer module 18, which are plugged into conventional sockets or wired in, and are thus connected to, the a.c. power line 12 at various locations in the home. As shown, for example in FIG. 1, a lamp 20 is plugged into module 14, an appliance, here a coffee maker 22, is plugged into module 16, and a ceiling lamp 24 is connected to module 18.

The design and manner of operation of the control modules 14, 16 and 18 in detecting the received binary coded address and control signals, and controlling their associated lamp or appliance in accordance with the detected control signal, is substantially the same as that disclosed in U.S. Pat. No. 4,200,862, incorporated herein by reference, so that no further description of the modules or their manner of operation is provided herein.

For a system in which, for example, 16 control modules are employed, each of the modules is identified by a unique four-bit binary address code corresponding to unit code 1 to 16, which may be set by hand by the use of a unit code switch 25 included in each module. That is, code switch 25 in module 1 is set to numeral 1, that in module 2 is set at numeral 2 and so on. Since the same ac power line may often extend through a number of different homes, each of the unit modules in a given residence may also have assigned to it a common house code, such as A. Thus, in this example, as indicated in FIG. 1, the 16 control modules in the residence are identified as module A1 to module A16.

The binary signals transmitted along the ac power line 12 from interface unit 10 to the control modules include, as described in greater detail below, the module address code, the house code, and the five-bit function or operation codes, such as "on", "off" or "dim," that define the function that is to be controlled by the addressed module along with the time or times of day that function is to be carried out. As also described below in greater detail, interface unit 10 may also transmit, via an rf antenna 71 (FIG. 4). rf-modulated binary-coded infrared (IR) remote control signals to an appropriate unit 45 that receives the rf signal and retransmits the coded IR control signals to a remote audio-visual device, such as a television receiver 34.

The appliance functions that are controlled by the control modules in the system of FIG. 1 may be programmed into interface unit 10 in advance to send coded signals to the control modules along the ac power line 12, for example, to turn the coffeemaker on at 7:30 a.m., and to turn lamp 20 on at 7:00 p.m. and off at 11:00 p.m. The interface unit 10 may, as in the embodiment shown, be programmed by means of a PC 28 containing appropriate resident software that is connected by a suitable RS-232 cable to the interface unit 10. To this end, as described in greater detail below, software in PC 28, when accessed, displays on the PC monitor 29 graphical representations of selected control modules A1–A(n), such as images of graphical "switches", which, by the use of a mouse 31 can be "turned on" and "turned off" at predetermined times of day to produce the appropriate module address and control function signals thereby to program the interface unit 10 to, in turn, produce the corresponding address and function control signals that, when applied onto the a.c. power line 12 control the operations of the modules and the lamps or appliances that are connected to those modules at various locations in the home.

Macros or preset sequences of events can also be set up by operation of on the PC 28, and stored in the interface unit 10, by use of another computer monitor display, as described in greater detail below, to turn on selected groups of lights and appliances when a preselected input stimulus such as a scheduled event, Internet command, or telephone signal is received at interface unit 10. For example, the user may wish to have a number of lights in different locations in the home turned on at different preset times upon his arrival at home, or turned off or dimmed when he retires later at night. These macros once set up by the PC 28 can be stored for future applications in the memory in the interface unit 10 or in the PC 28.

The input stimulus to trigger a macro received by interface unit 10 can also be derived from a manually controlled power line controller 35, which, in accordance with the selected code, sends a pre-determined trigger code, or from a wireless RF controller 33, which sends a predetermined code in the form of an RF signal to the interface unit 10 as described in greater detail below. The macros can also be made to occur upon the occurrence of certain conditions e.g. a light turns on if a code is received and it is dark. To this end, the interface unit 10 may be programmed to recognize when it is dark from a lookup table of longitude and latitude settings that the user can select for storage in unit 10 such as via the PC software.

The user software in the PC 28 can also be controlled and accessed by the user from the PC keyboard or by a wireless mouse-remote 33 that transmits 310 MHz control signals to the unit 10. The latter receives those signals at its 310 Mhz receiver antenna 32 and passes to the PC 28 via the RS-232 connection 36 connected between the serial part of PC 28 and the interface 56 (FIG. 4) of interface unit 10. The mouse-remote 33 thus permits the user to control all PC functions as in the case of a regular mouse.

Similar to what is described in U.S. Pat. No. 4,200,862, the binary coded address and control information is transmitted along the a.c. power line 12 to the modules in the form of 1 ms rf bursts or pulses at a typical frequency of 120 kHz. The presence of a burst represents a logic 1, whereas the absence of the 120 kHz burst represents a logic 0. In the binary code transmission scheme described in the aforesaid '862 patent, the transmission of the coded burst signals are synchronized to the zero crossing points of the a.c. power line signal at or just after each zero crossing point of the a.c. power signal. That is, as illustrated in FIG. 2, for a three-phase a.c. 60 Hz system, 1 ms bursts or pulses are formed at or shortly (within 100 $\mu$sec) after the zero-crossing point of all three phases of the three-phase a.c. distribution system.

Figure 3A:
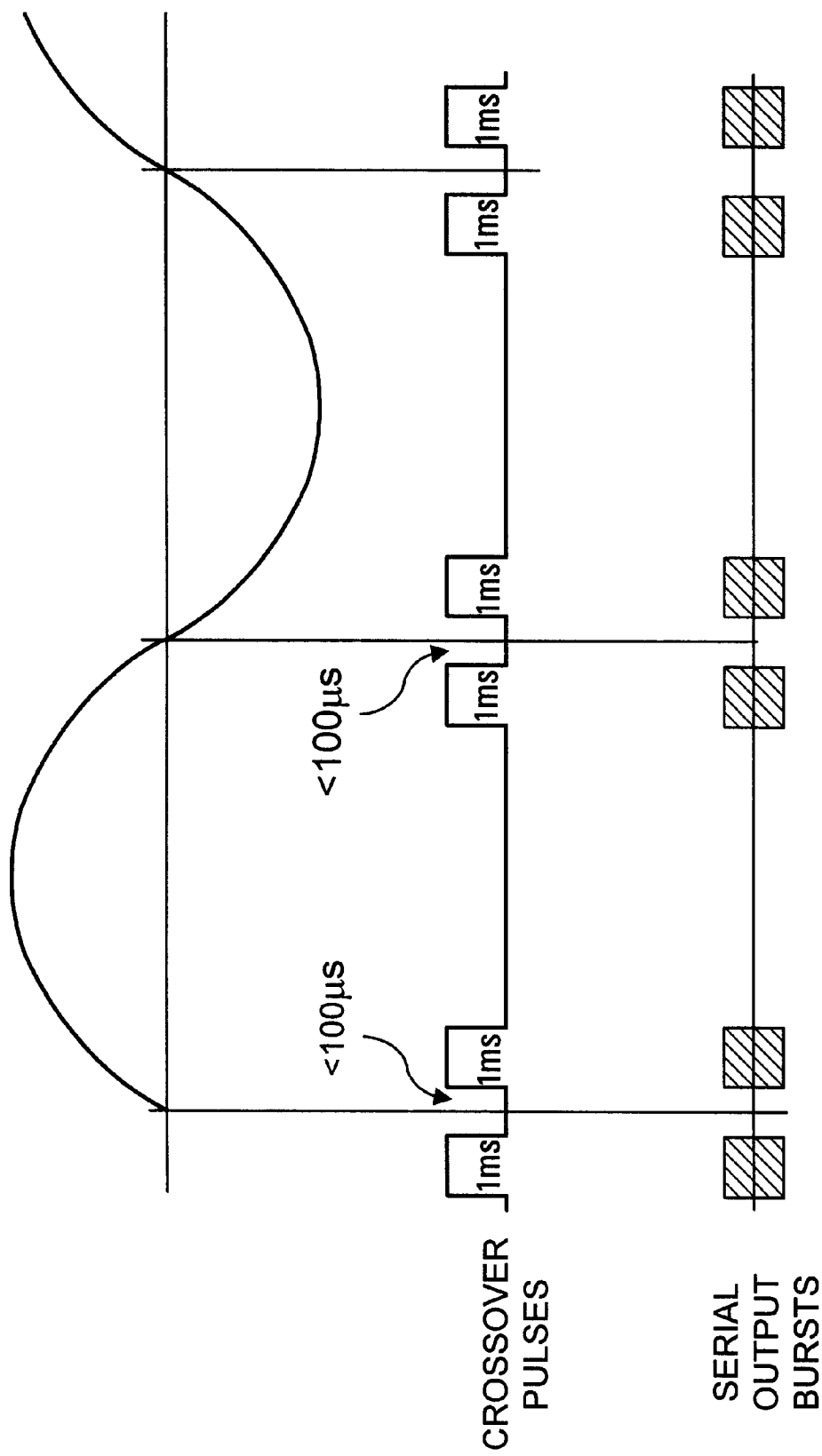
FIGS. 3A and 3B are wave forms of one cycle of an a.c. power line voltage illustrating the occurrence of signal bursts both before and after each zero crossing point of the a.c. signal, as in the control system of the invention, in a single-phase and in a three-phase distribution system.
Figure 3B:
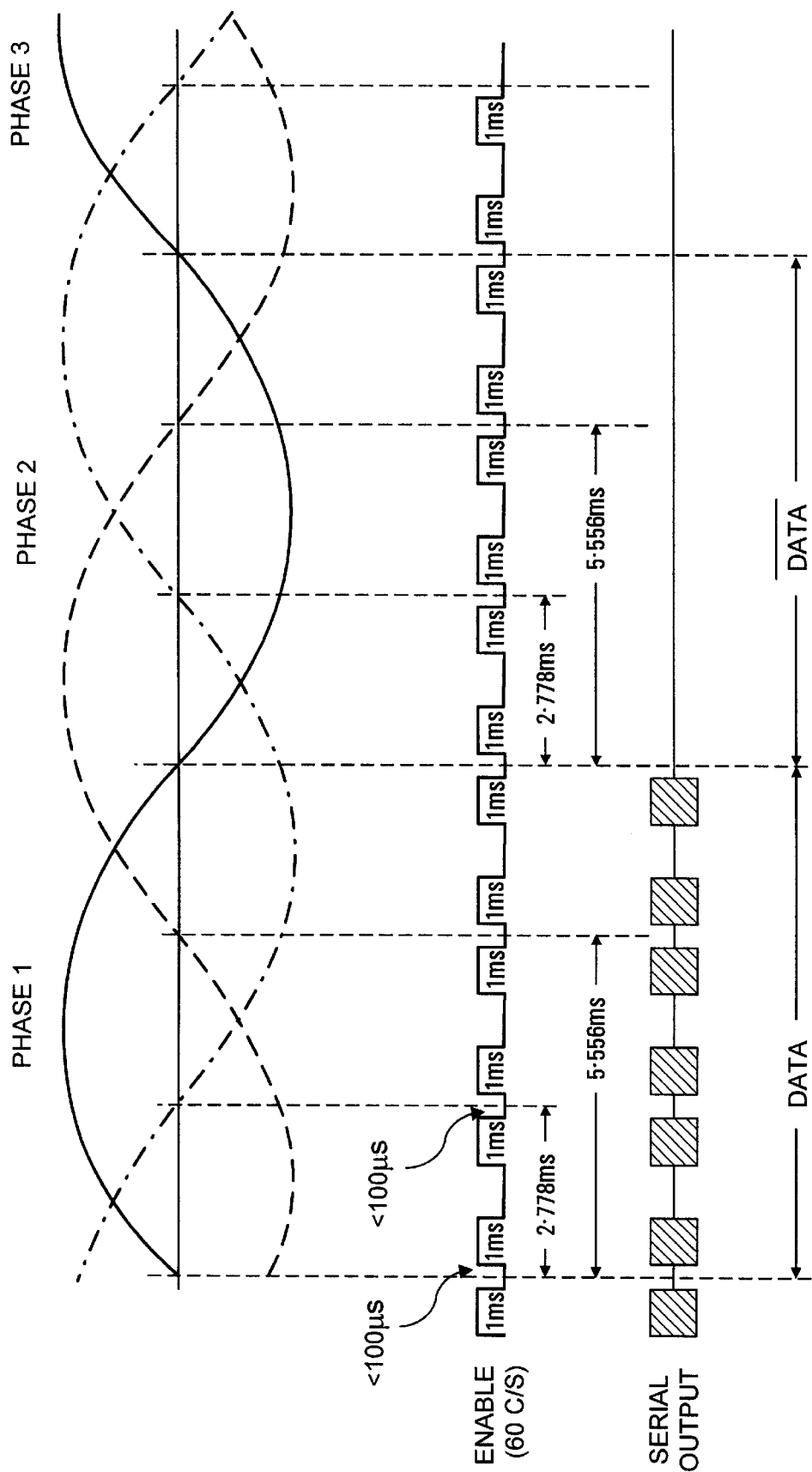

In a departure from, and an improvement over, the control system disclosed in the '862 patent, in the control system of the present invention, as shown in FIGS. 3A and 3B, the coded burst signals are produced both before and after the zero crossing points of the a.c. power line signal. That is, in addition to transmitting an rf binary burst signal shortly after each of the three zero crossing points (for a three-phase system), as in the prior art, in the control system of the present invention, an rf burst signal or pulse is also transmitted along the a.c. power line before each of the zero-crossing points.

Thus, as shown in FIGS. 3A and 3B, after zero crossing is detected, the next zero crossing (in a 60 Hz system) is 8.333 ms later. Therefore, after zero crossing is detected, a 1 ms burst is transmitted 7.333 ms later. This puts the 1 ms burst within 100s of the next zero crossing point of 8.333 ms. An rf burst or pulse is also transmitted at 1.778 ms, and 4.556 ms, and so occur right before the other two zero crossings of 2.778 ms, and 5.556 ms in a three-phase distribution system (FIG. 3B). The timing between each of the three zero-crossing points is different in a 50 Hz distribution system, and would be compensated for by automatically detecting whether each zero crossing occurs at a rate of 60 times per second or 50 times per second. The use of the coding system of the invention, as illustrated in FIGS. 3A and 3B, allows code combinations to be transmitted right after and right before zero crossing, which is double the number of available codes that could be transmitted in the control system described in the '862 patent.

Figure 2:
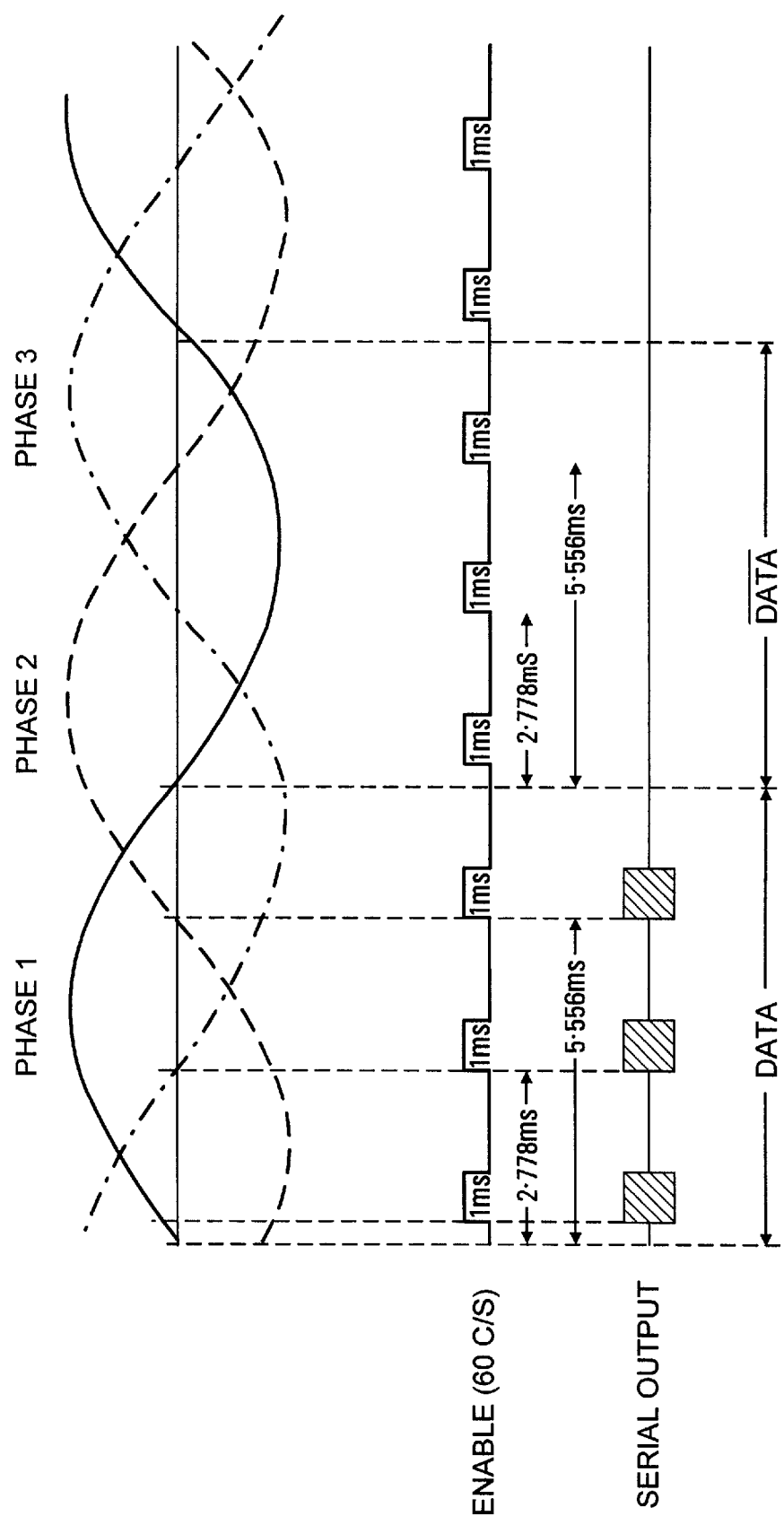
FIG. 2 illustrates wave forms of an a.c. power line voltage illustrating the formation of binary bursts at or near the zero-crossing points as in the prior art system disclosed in the '862 patent in a three-phase distribution system.

As described in the '862 patent and shown in FIG. 2, data in the prior coding schemes are transmitted on one half cycle, and data bar (the complement) is transmitted on the next half cycle. When the coded signals are received at the modules these two half cycles are compared, and if the data, data bar relationship is not found to be true, the code is rejected and is assumed to have been corrupted by power line noise. In the coding arrangement of the present invention, as shown in FIGS. 3A and 3B, data are transmitted after the zero crossing points and data bar are transmitted before the zero crossing points (or vice versa), thereby to provide better noise immunity as compared to the prior code transmission. The novel code transmission of the present invention provides better security because it is less likely that a code sequence could be accidentally produced from noise or any other power line carrier signal.

The coding scheme of the invention can thus either provide twice the number of available codes, or achieve better noise immunity and thereby more security. The first option is achieved by transmitting data 1 and data 2 on alternate half cycles, and the second option is achieved by transmitting data, data bar on alternate half cycles. This selection of either option can be made either by a mechanical switch or by software control. The control modules may contain an EEROM (Electrically Erasable Read Only Memory) to store the selected coding option so that the code can be reconfigured at any time. An initiate secure communication code signal could, for example, be sent from PC 28 to the interface unit 10, and the control modules A1–A(n) would then wait for the additional signal information. Other configuration information could also be stored in EEPROM 66 (FIG. 4) in interface unit 10 such as the address of the control module.

Furthermore, transmitting data after the zero crossing point and data bar before the zero crossing (or vice versa) and comparing the two, instead of transmitting data and data bar on alternate half cycles and comparing the two, reduces the time to transmit a complete code sequence by half, thereby achieving a faster data rate and more throughput of data. The transmission of data after zero crossing, and data bar before zero crossing and vice versa, this speeds up the data rate.

Figure 4:
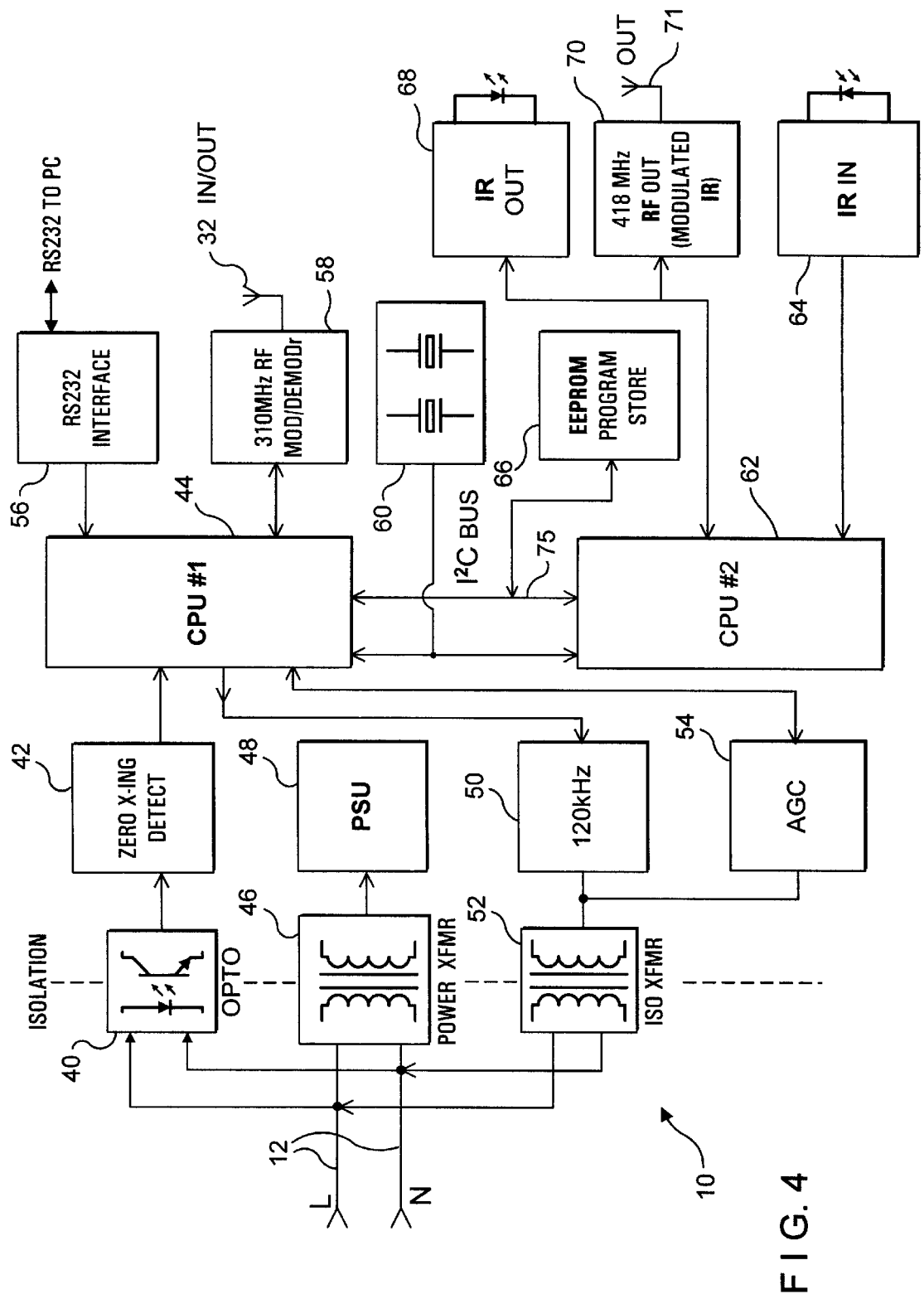
FIG. 4 is a schematic block diagram of a transmitter control unit that may be used the automated appliance control system of the invention.

FIG. 4 is a schematic diagram of an embodiment of a control interface unit 10 that may be used in the automated control system of FIG. 1. An isolating power transformer 46 connected to the ac line 12 steps down the 120V a.c. power line voltage and provides a low voltage a.c. output to a power supply unit 48, which provides low-voltage d.c. voltages for the other components of the interface unit 10.

As described above, the coded burst signals produced in interface unit 10 are synchronized to the zero crossing points of the ac power line 12 so that data burst transmissions occur before and after each of the zero crossing points. This requires that a direct connection be made between interface unit 10 and the ac power line 12 in order to detect when the ac signal passes through zero. This connection cannot be made through a power transformer as this would introduce a phase shift that could cause a delay between the actual zero crossing and the detected zero crossing point. A direct connection to the ac line would, however, require that the ground point in the circuitry be referenced to 120V AC which would introduce a potential safety hazard. In order to obtain approval from Underwriters Laboratories all connections that are accessible to the user must be isolated. To achieve such isolation, the interface unit 10 is connected to the ac power line 12 by an opto-coupler 40.

The 60 Hz (or 50 Hz) signal that is developed in octo-coupler 40 is applied to an input of a zero-crossing detect circuit 42 in which, through a series resistor, that ac signal is clamped to both power supply rails to produce a 5 volt 60 Hz (or 50 HZ) square wave. The output of detect circuit 42 is applied to an input of microprocessor 44, which may be programmed from the PC 28, as described in greater detail below, or by the manual operation of the buttons on a manual controller 35 (FIG. 1) coupled over the ac power line 12 to the interface unit 10 to develop the binary coded 1 ms pulses at times both before and after the a.c. zero-crossing points. The manner in which the 1 ms pulses are produced in microprocessor 44 may be similar to that disclosed in the '862 patent, modified so as to produce the coded rf pulses both before and after the a.c. signal zero crossing points. For example, logical "1" signals may be sent after the zero crossing point and then transmitted for a milliseconed. No signals for a logical "1" are transmitted before the following zero crossing point. Logical "0" signals are sent by detecting the zero crossing point, and then counting down the time until 1 millisecond before the next zero crossing. At this point, the signal is placed on the power line until the next zero crossing is detected.

The coded control signal 1 ms pulse envelopes, synchronized to the zero crossing points of the a.c. line produced in microprocessor 44 are passed to a 120 KHz modulator that is included in the burst signal circuit 50, which produces bursts of a 120 kHz signal modulated by the 1 ms pulses from microprocessor 44 (See FIGS. 3A and 3B). Those coded rf pulses, which represent the addresses and functional commands for the addressed control modules, are coupled back onto the a.c. line 12 through an isolating coupling transformer 52, from where the coded signal bursts are transmitted along the a.c. power line 12 to the control modules, as illustrated in FIG. 1.

The burst control address and control data signals that are applied to the ac power line 12 from burst signal circuit 50 are also passed through an automated gain control (AGC) circuit 54. The coded burst signals on the a.c. line will be received in AGC circuit 54 even in the presence of several volts of noise as long as there is at least a 2:1 ratio between the burst signal and the noise. These control input signals, as noted previously, can be set up by the user to initiate macros (a series of home control events). The burst control signals are received by the interface unit 10, which then transmits a predetermined sequence of control signals to the modules to control other appliances. In addition, the interface unit 10 will provide instructions to the PC 28, for example, send e-mail or launch other applications (as well as log the signals). The interface unit 10 may also send other IR over-the-air command signals to control equipment or appliances that may not be controlled by control signals transmitting over the a.c. power line 12.

An RS-232 interface 56 having an output coupled to an input of microprocessor 44 and an input coupled to the PC 28 allows the programming of the interface unit 10 to be carried out at the computer 28 or on any other device that has RS-232 capability. This allows the user to control, that is, program the control system of the invention, and particularly the interface unit 10, from the PC 28 via Windows-based PC software or any other platform.

The programmed binary-coded burst signals produced in microprocessor 44, in the manner described above, may also be applied to a 310 mHz modular/demodulator 58, which modulates the coded control signals onto a higher frequency (e.g. 310 mHz) carrier, and transmits those coded rf signals from an antenna 32 over-the-air to a 310 MHz transceiver 37 (FIG. 1), that receives and detects the binary coded signals and passes them back onto the a.c. power line 12 from where they can be received by the appropriate control modules.

The modulator/demodulator 58 may also receive at antenna 32 modulated control signals at a frequency of 310 mHz from a wireless RF mouse/remote 33. These signals are demodulated in modulator/demodulator 58. The demodulated binary coded signals are then applied to, and processed by, microprocessor 44 to establish the desired address timing and control functions that are to be carried out by the control modules under the control of interface unit 10. The control signals generated in microprocessor 44 may also be returned to, and stored in, the PC 28 over the RS-232 cable via interface 56. This use of the wireless mouse/remote 33 thus provides control of the PC functions in the same manner as a conventional mouse. These signals allow the PC 28 to read data from the interface unit 10 (i.e. receive appliance control signals) at the same time it receives input from the wireless mouse 33.

An oscillator 60, which, as shown in FIG. 4, contains two 8 MHz resonators, supplies clock signals to control the operation and timing of microprocessor 44, as well as the operation of a second microprocessor 62 that is coupled to the main microprocessor 44 via an I²C bus. Microprocessor 62 may receive the control signals from microprocessor 44 to provide infrared (IR) processing of IR codes captured by an IR receiver 64 from standard IR remote controls and input to microprocessor 62. Thus, for example, the microprocessor 62 may receive I²C signals on I²C bus from the main microprocessor 44 that determine which IR code from a standard library (i.e. programmed in the ROM of microprocessor 62), or transmits the location of the code in EEPROM program store 66 if the desired code does not reside in the ROM of microprocessor 62. In this case, microprocessor 44 will use the I²C bus to read the IR code from the EEPROM program store 66.

The coded module address timing and function control signals may also be downloaded from the PC 28 via interface 56 to microprocessor 44. In addition, IR control coded signals may be supplied to microprocessor 62 from an encrypted library of codes stored in EEPROM program store 66. Specific IR codes selected via the user software from the codes stored in EEPROM program store 66 can also be input to the microprocessors 44 and 62, and transmitted by an IR transmitter, such as an LED emitter 68, to control standard consumer electronic products such as TVs, VCRs, cable boxes, stereos, CD players, Digital Satellite System (DSS) receivers, and DVD players in the same room. The IR-coded signals from microprocessor 62 may be applied from an 418 mHz rf transmitter 70 via its antenna 71 to the RF-to-IR converter 45 (FIG. 1), which then transmits the demodulated IR signals to control audio-visual home entertainment products located in another room in the house.

EEPROM program store 66 may also store user-programmed data that represent home automation and security control functions, as well as data reflecting the current status of the appliance control modules installed around the house, as well as the macros that are executed whenever a timed event or macro initiator is received, as described in greater detail below.

Figure 5:
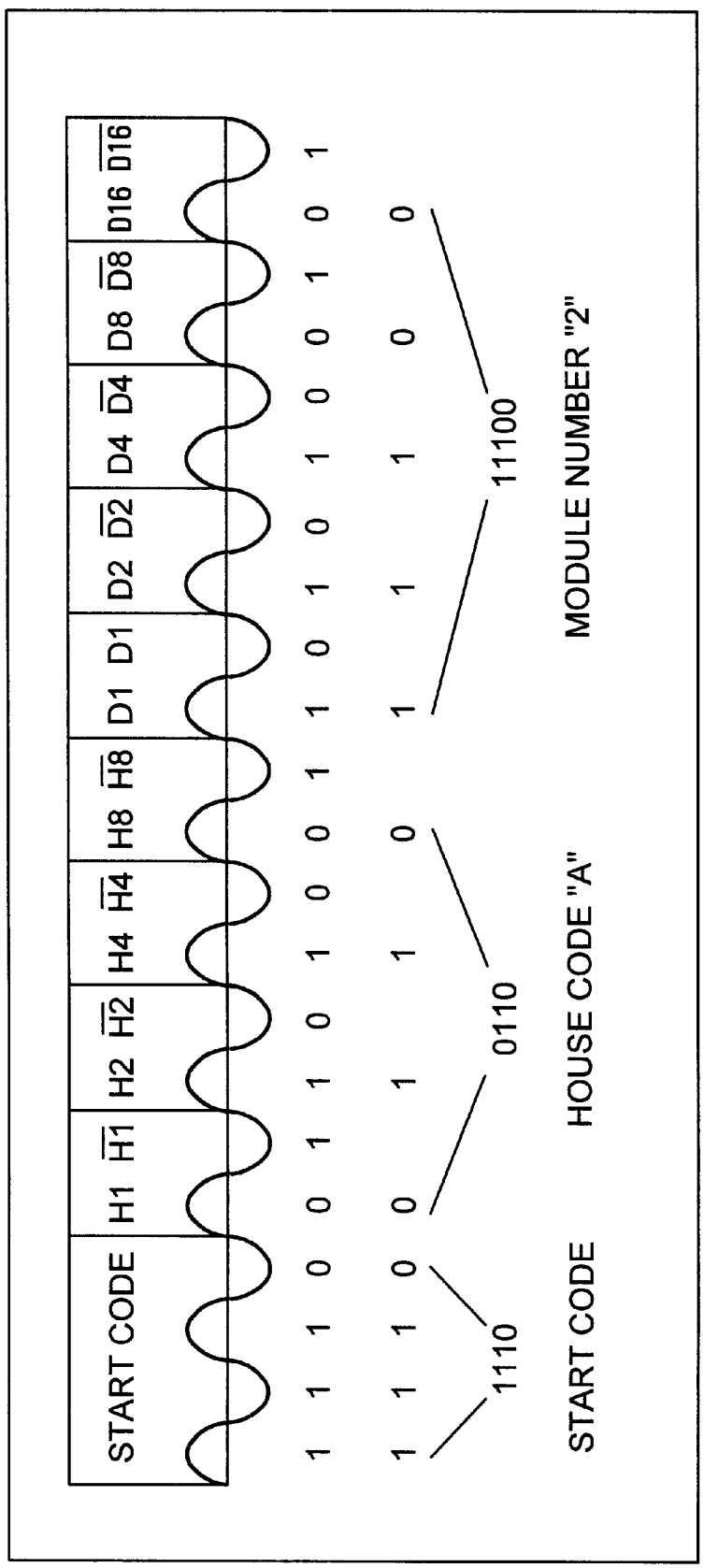
FIG. 5 is a binary coded transmission sequence that may be transmitted along the a.c. power line in the operation of the system of FIG. 1.

A complete data message transmitted from interface unit 10 to the control modules, in a typical application of the control system of the invention, may, as shown in FIG. 5, encompass eleven cycles of the a.c. power line, in which the first two cycles represent the start code, the next four cycles represent the house code, and the next five cycles represent the key code, that is, either the number or address code (1 through 16), or a function or operation (on, off, etc.) code. This complete block of coded data (start code, house code, key code), is transmitted in groups of two, with three power line cycles between each group of two codes. The bright and dim control code may be transmitted continuously (at least twice) with no gaps between codes.

As illustrated in FIG. 5, within each block of coded data, each four-or-five bit code is transmitted in true and complement form on alternate half cycles of the a.c. power line. For example, if a 1 ms burst of signal is transmitted on one half cycle (binary 1) then no signal is transmitted on the next half cycle (binary 0), or vice versa, except for the start code, which, in the sequence illustrated, is always 1110.

The various timing and control codes may be transmitted according to Table 1 below which includes 16 house codes (A thru P) and 16 available number codes giving 256 unique control module addresses. Sixteen different functions are also available (e.g. on, off, bright, dim, etc.). Three of the codes shown in the Table can be used for extended codes (01111, 11001, and 10101). That is, any data that follows these codes is considered as "more code." Extended commands indicate that there is more code to follow after the extended current message. The number of bits following is based upon the message and may typically be in the order of 16 bits. This may be changed at will, depending upon the message that is being transmitted. For example, if a system requires 32 bits of information, then an extended message could be created that sends an identifier to indicate that 32 bits of information are to follow, and then the next 32 bits on the power line would be applied to this message.

|   | D8 | D4 | D2 | D1 | D14 |
|---|----|----|----|----|-----|
| 1 | 0  | 1  | 1  | 0  | 0   |
| 2 | 1  | 1  | 1  | 0  | 0   |
| 3 | 0  | 0  | 1  | 0  | 0   |
| 4 | 1  | 0  | 1  | 0  | 0   |
| 5 | 0  | 0  | 0  | 1  | 0   |
| 6 | 1  | 0  | 0  | 1  | 0   |
| 7 | 0  | 1  | 0  | 1  | 0   |

-continued

|  | D8 | D4 | D2 | D1 | D14 |  |
|---|---|---|---|---|---|---|
| 8 | 1 | 1 | 0 | 1 | 0 |  |
| 9 | 0 | 1 | 1 | 1 | 0 |  |
| 10 | 1 | 1 | 1 | 1 | 0 |  |
| 11 | 0 | 0 | 1 | 1 | 0 |  |
| 12 | 1 | 0 | 1 | 1 | 0 |  |
| 13 | 0 | 0 | 0 | 0 | 0 |  |
| 14 | 1 | 0 | 0 | 0 | 0 |  |
| 15 | 0 | 1 | 0 | 0 | 0 |  |
| 16 | 1 | 1 | 0 | 0 | 0 |  |
| ALL UNITS OFF | 0 | 0 | 0 | 0 | 1 |  |
| ALL LIGHTS ON | 0 | 0 | 0 | 1 | 1 |  |
| ON | 0 | 0 | 1 | 0 | 1 |  |
| OFF | 0 | 0 | 1 | 1 | 1 |  |
| DIM | 0 | 1 | 0 | 0 | 1 |  |
| BRIGHT | 0 | 1 | 0 | 1 | 1 |  |
| ALL LIGHT OFF | 0 | 1 | 1 | 0 | 1 |  |
| EXTENDED CODE 1 | 0 | 1 | 1 | 1 | 1 | FOR DATA/CONTROL |
| HAL REQUEST | 1 | 0 | 0 | 0 | 1 |  |
| HAL ACKNOWLEDGE | 1 | 0 | 0 | 1 | 1 |  |
| EXTENDED CODE 3 | 1 | 0 | 1 | 0 | 1 | FOR SECURITY MESSAGES |
| PRESET DIM | 1 | 0 | 1 | 1 | 1 |  |
| EXTENDED CODE 2 | 1 | 1 | 0 | 0 | 1 | FOR METER READ & DSM |
| STATUS "ON" | 1 | 1 | 0 | 1 | 1 |  |
| STATUS "OFF" | 1 | 1 | 1 | 0 | 1 |  |
| STATUS REQUEST | 1 | 1 | 1 | 1 | 1 |  |

Thus the original 256 unique code combinations can be expanded by adding more bits of code, which can be transmitted before or after the zero crossing points, or both. As an example, the next 4 bits that follow the extended code may represent 4 more unit code bits (16 combinations), the next 8 bits may represent 8 bits of data (256 combinations), and the next 8 bits may represent commands (256 different commands).

Figure 6:
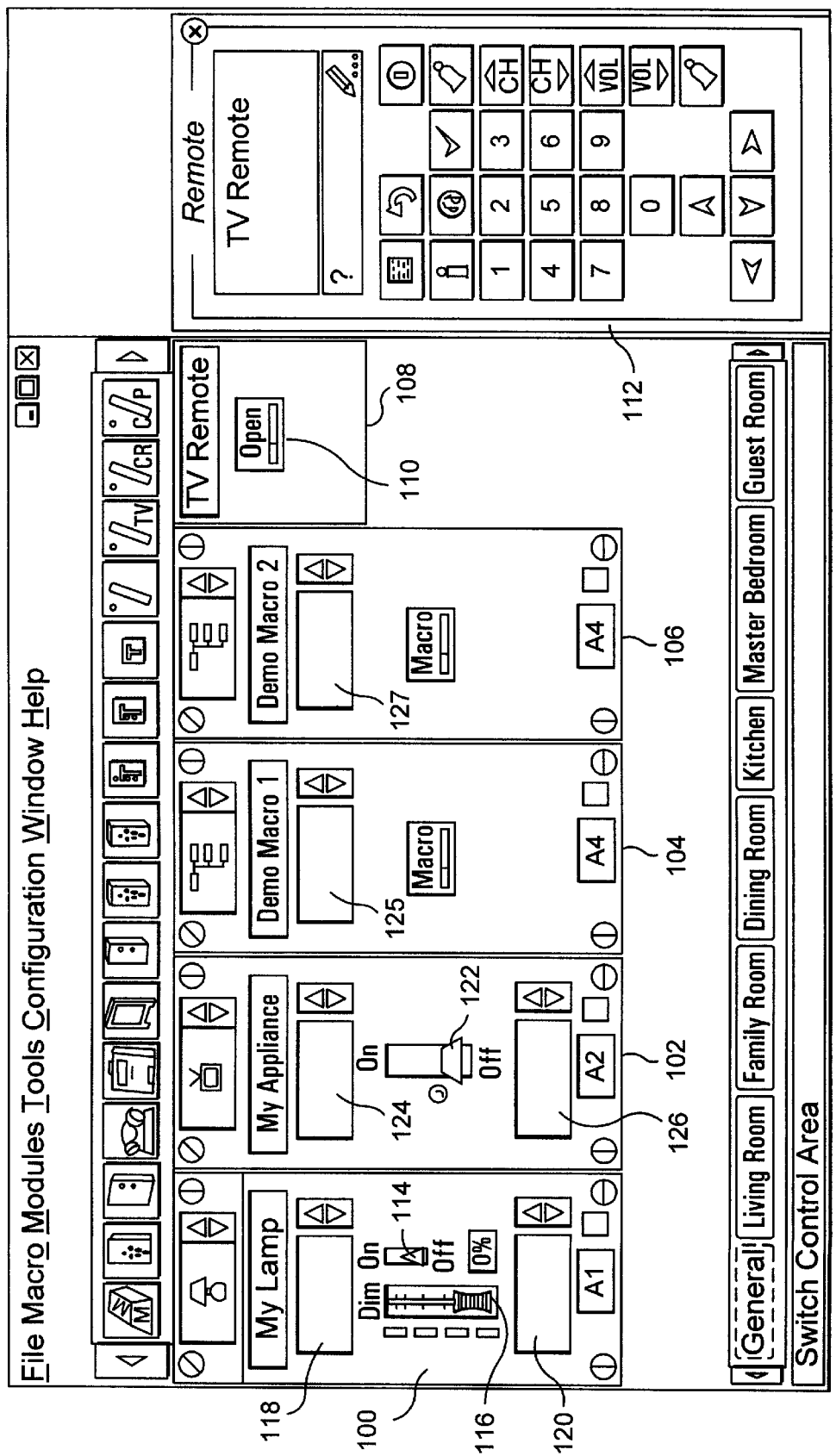
FIG. 6 is a PC monitor screen display that can be produced by software resident in the PC for use in programming the control system of the invention.
Figure 7:
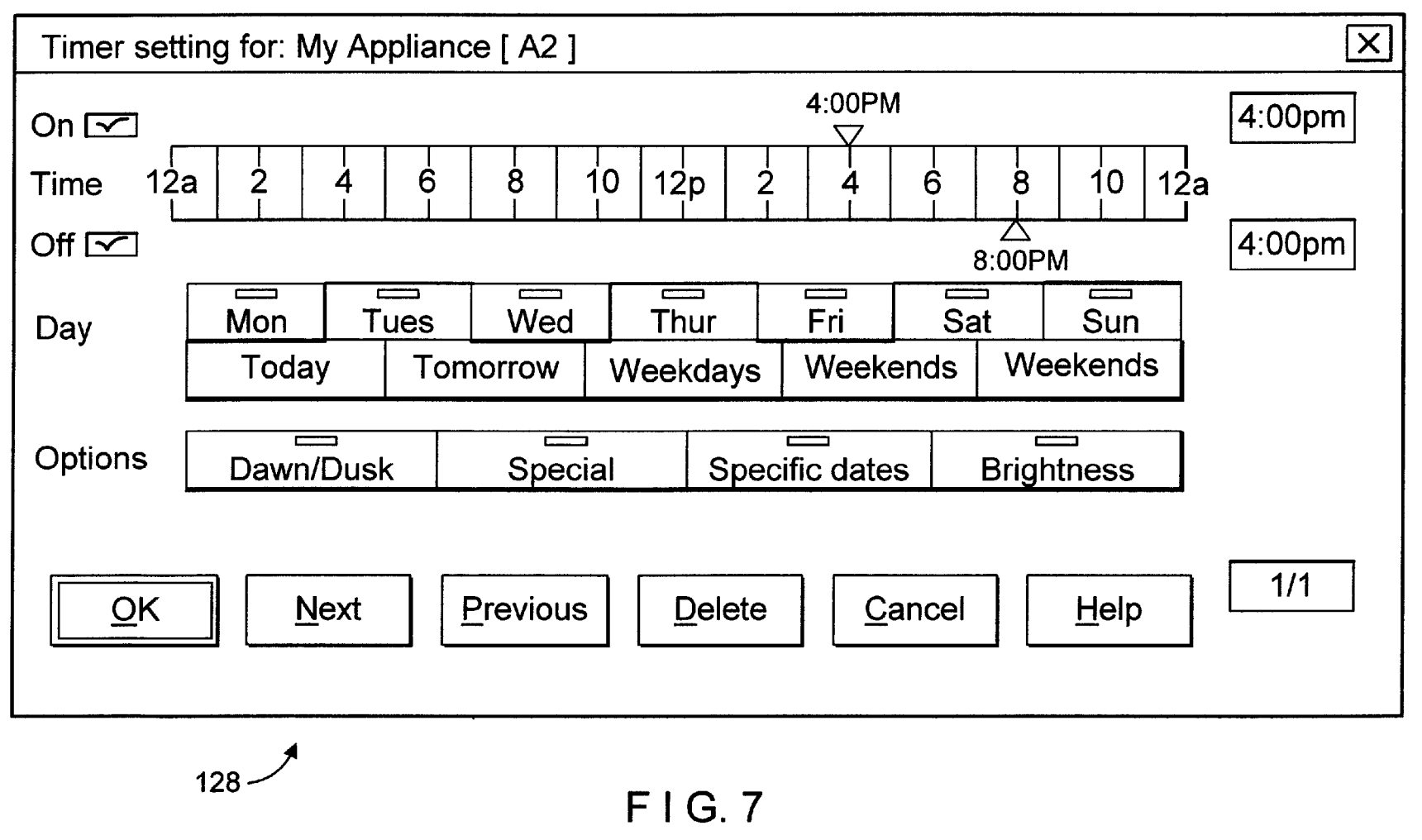
Figure 8:
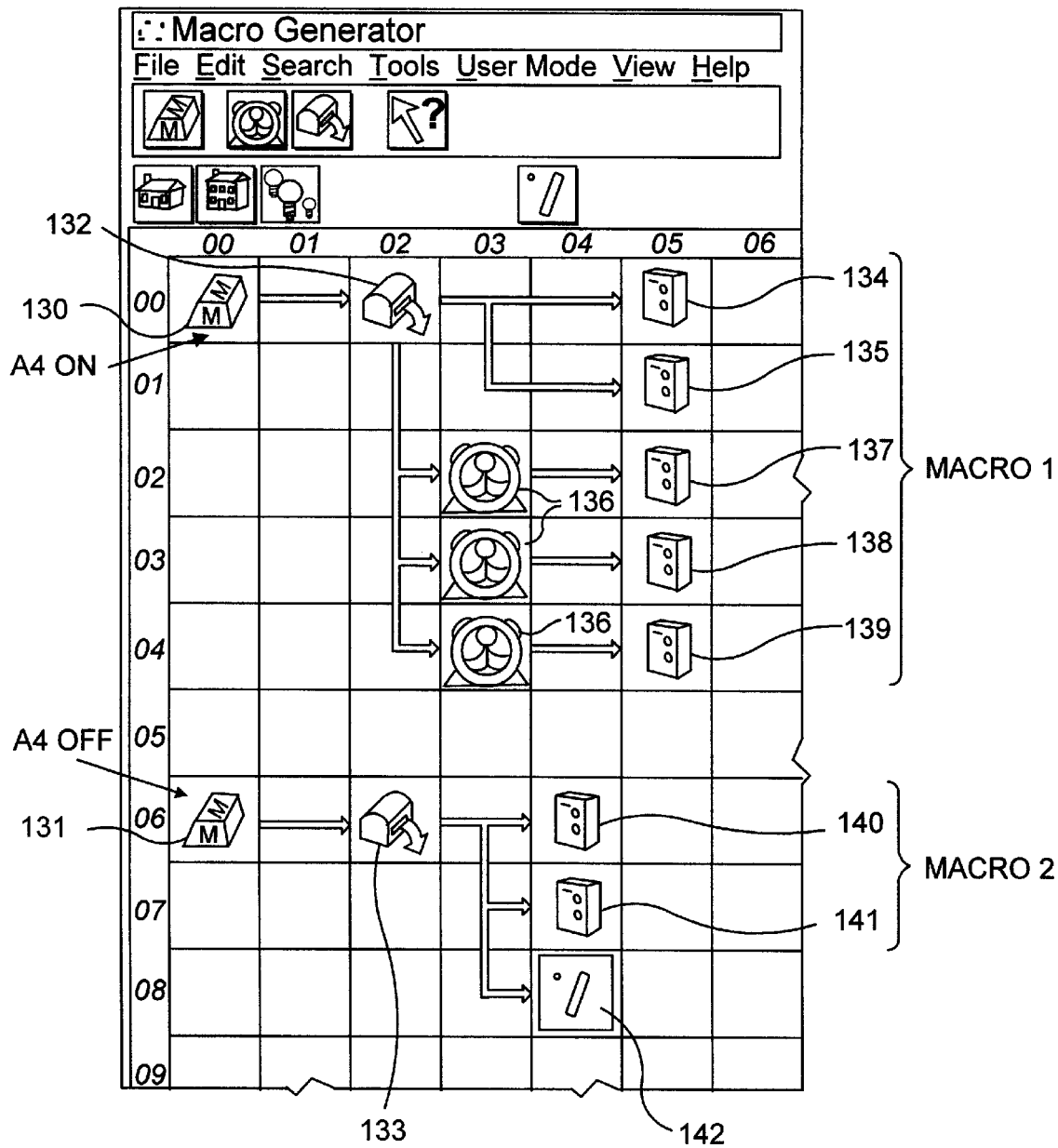
FIG. 8 is a further PC screen display that may be used in programming macros or sequences of timed operations of the control system of the invention.

FIGS. 6–8 illustrate three representative screen displays or screen images that may be generated for display on monitor 29 of PC 28 such as by operation of the standard mouse 31. To this end, PC 28 is provided with appropriate resident software that is not further described herein. As shown in FIG. 6, windows 100 and 102 in this display may, for example, respectively represent lamp control module A1 and appliance control module A2. It will be understood that a window, such as those shown in FIG. 6, may be created on the PC monitor 29 for each control module A1–A(n) in the control system such as the one shown in FIG. 1. Lamp control window 100 includes time-set rectangles 118, 120 in which the desired times may be entered by operation of the mouse 31 to turn the lamp controlled by module A1 on and off at the selected times.

Also included in the screen display of FIG. 6 is a TV remote control window 108, which when clicked by the operation of mouse 31 at its "open" area 110, produces a graphical representation 112 of a conventional TV IR remote control unit that includes channel select "buttons," volume and channel modifiers, on-off control, and the like.

The lamp control module window 100 also includes a visual representation of an on-off switch 114 and a dimmer control 116, which may be controlled by moving the cursor over the appropriate region of the window display and then double clicking the mouse 31. PC 28, in response, produces a corresponding digital control (e.g. on-off or dim) signal for the appropriate control module, here module A1. That digital signal is coupled to interface unit 10 over the RS-232 cable 36 where it is stored in the microprocessor 44 and then, as described previoiusly, produces the corresponding binary coded bursts that are transmitted along the ac power line 12 to the control modules, which, in response, perform the desired on-off and dimmer functions at the prescribed times.

Appliance control window 102 includes a visual representation of a switch 122 and time-on and time-off areas 124 and 126, which can be set by use of the mouse 31, as described above with respect to the lamp control window, to provide digital control signals to the microprocessor 44 in interface unit 10. As described previously, corresponding binary coded bursts signals are produced in interface unit 10 that are transmitted along the ac power line 12 to module A2 to control the timed operation of the appliance connected to module A2. Macro windows 104 and 106 represent the macros 130 and 131, which are described later in this specification with respect to FIG. 8. As shown in FIG. 6, the macros are intended to operate under the control of code A4, and the times for initiating these macros are set in time windows 125, 127.

The screen display 128 of FIG. 7 is called up on the PC monitor by clicking on any of regions 118, 120, 124 or 126 in the display of FIG. 6 whenever it is desired to set the times and days on which a control module, such as module A2, shown for purposes of example in FIG. 6, is to operate to control its associated lamp, appliance or the like. As shown, display 128 includes on and off windows and time, day and options signals, which can be accessed by the cursor under mouse control to set the function (e.g. on or off), and the times and days on which the appliance associated with the programmed control module is to be turned on and off. In the example illustrated in FIG. 7, the appliance controlled by module A2 will be turned on at 4:00 p.m. and turned off at 8:00 p.m. on Mondays, Wednesdays and Fridays.

The use of the screen display in FIG. 7 also permits the control modules to be programmed for timed operation by clicking the mouse at the "options" segment to cause the associated lamp or appliance to be turned off or on at dawn or dusk, to operate only on specific dates, or, in the case of a lamp, to be of a certain brightness or other special operation.

When it is desired to establish a macro, the macro generator window display at FIG. 8 is generated on the PC monitor by clicking on the macro icon with the mouse. The macro symbols 130 and 131 are moved or dragged into the 00 column, and are connected via a line to macro initiate symbols 132, 133 in the 02 column. Under mouse operation, the macro initiator 132 is connected directly to the symbols of control modules 134, 135 and through a group of macro operational delay symbols 136 to three additional control module symbols 137, 138 and 139.

A second macro can be initiated in a similar manner by moving or dragging the macro icon into the 06 row in column 00 to create the macro symbol 131, which is linked through macro initiator 133 to control modules 140 and 141 and remote control unit symbol 142. The time that the macros are actuated to control the operation of the associated appliance and lamp, such as to turn them on and off, is noted in time windows 125, 127.

In the first macro, upon the occurrence of the preselected macro trigger, such as returning home and turning on module A4 at 130, the modules A1 and A2, graphically represented at 134 and 135, will turn on, and after a preset time delay 136, the lamp and appliances associated with these control modules, graphically represented at 137, 138 and 139, will also turn on. The establishment of the second macro is triggered by module A4 being turned off at 131 to selectively operate the control modules represented at 140 and 141 and the IR remote control represented at 142.

It will be appreciated from the foregoing description of a presently preferred embodiment that the automated control system according to the present invention provides increased versatility and security of use as compared to the prior control system. It will also be appreciated that modifications and variations to the described embodiment may be made without necessarily departing from the spirit and scope of the invention.

What is claimed is:

1. A system for controlling the operation of a plurality of electrically operated devices, said system comprising a programmable interface unit comprising means for producing multibit binary address and function control signals, said signal producing means comprising means for producing pulses both before and after selected zero crossing points of the a.c. power line voltage and for forming said multibit binary address and function control signals from said pulses, means for applying said multibit binary address and function control signals on to the a.c. power line; and a plurality of control modules operatively electrically connected to the a.c. power line, each of said control modules being identified by a unique address and responding to a function control signal addressed to it to control the operation of an electrical device operatively electrically connected thereto.

2. The system of claim 1, in which said signal producing means further comprises means for modulating said pulses onto an rf carrier signal to produce a series of binary coded rf bursts that occur before and after selected zero crossing points of the a.c. power line voltage.

3. The system of claim 1, further comprises means for connecting said interface unit to an external PC to permit said interface unit to receive address and function data from said PC, and means in said interface unit for producing said pulses in a binary code corresponding to said received address and function data.

4. An interface unit for use in an appliance control system to control the operation of at least one appliance electrically connected to an ac power line, said interface unit comprising input means for receiving data defining an appliance address and an appliance function; means coupled to said input means for generating, synchronously with an a.c. power line voltage, multibit coded digital signals corresponding to said appliance address and function data, the bits of said multibit digital signals occurring both before and after selected zero crossing points of the a.c. power line voltage, said coded binary signals defining said appliance address and said appliance function; and means for injecting said coded binary signals onto the a.c. power line.

5. The interface unit of claim 4, further comprising means for modulating said digital signals onto an rf carrier signal to produce a series of binary coded rf bursts that occur before and after selected zero crossing points of the a.c. power line voltage.

6. The interface unit of claim 4, further comprising means for connecting said interface unit to an external PC and for receiving appliance address and function data from said PC, and means for producing said pulses in a binary code corresponding to said received address and function data.

7. The interface unit of claim 4, in which said injecting means includes means for modulating said coded binary signals onto an r.f. signal, and means coupled to said modulating means for transmitting said modulated r.f. coded signals to a remote transceiver to couple to the a.c. power line.

8. The system of claim 1, in which said signal applying means includes means for modulating said coded binary signals onto an r.f. signal, and means coupled to said modulating means for transmitting said modulated r.f. coded signals to a remote transceiver.

\* \* \* \* \*